April 12, 1960
R. D. MOHLER
2,932,783
VOLTAGE REGULATED POWER SUPPLY
Filed Aug. 1, 1958
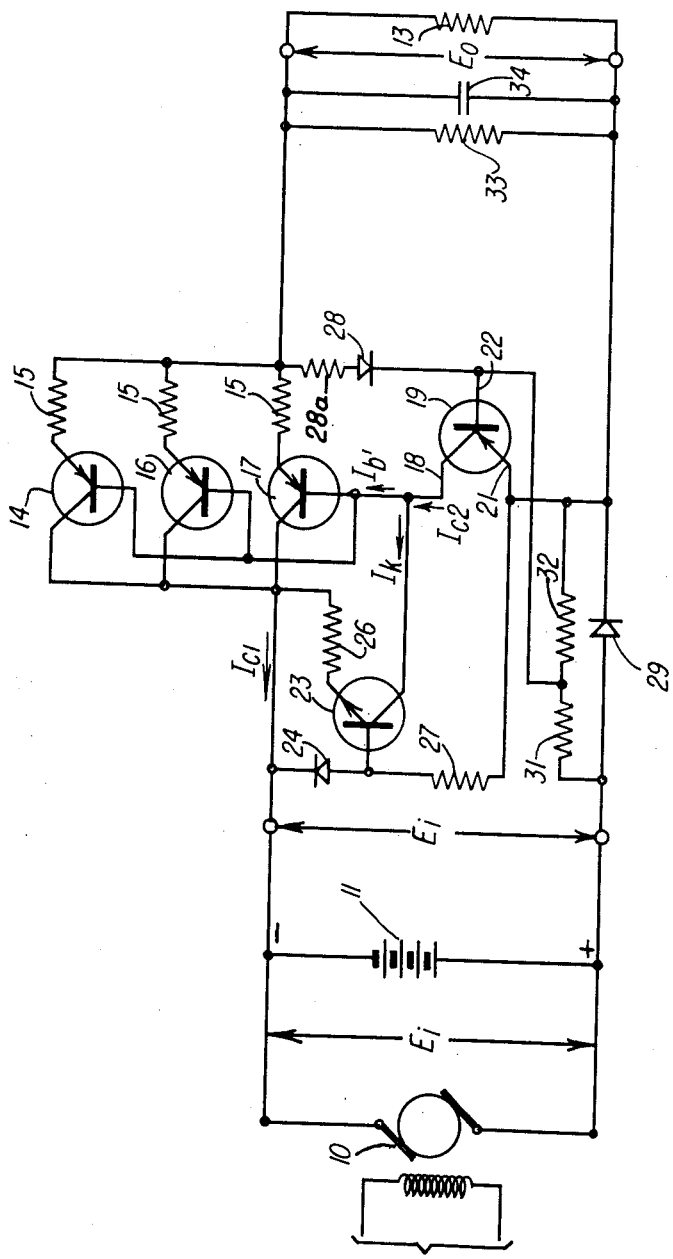
INVENTOR.
Robert D. Mohler
BY Mueller & Aichele
Attys.

2,932,783
Patented Apr. 12, 1960

2,932,783
VOLTAGE REGULATED POWER SUPPLY

Robert D. Mohler, Glen Ellyn, Ill., assignor to Motorola, Inc., Chicago, Ill., a corporation of Illinois Application August 1, 1958, Serial No. 752,515

6 Claims. (Cl. 323—22)

This invention relates to voltage regulated power supplies and more particularly to power supplies employing transistors as control elements.

Voltage regulated power supplies are required to deliver a direct current voltage of constant value regulated against both changes in input voltage and load values. In general, electronic means of accomplishing this control are preferable to electromechanical means and such electronic means desirably incorporate transistors as control elements in preference to vacuum tubes because of superior life expectancy and the desirable compactness of transistors. One of the principal drawbacks to the use of transistors in voltage regulators has been the variation of performance parameters of the transistors with temperature changes and the difficulty in stabilizing against such changes.

Some voltage regulator circuits have employed a Zener diode as a voltage reference element with compensating means adapted to detect and react to deviations between output voltage and the selected reference voltage. Naturally, it is desirable that this reference voltage be stable over a wide range of operating conditions. Zener diodes include internal resistances and under some conditions a variation in the load current of the system may produce a change in the potential drop across this resistance resulting in a change in the reference voltage. This causes the system to regulate less effectively.

It is an object of the present invention to provide a voltage regulated power supply of high reliability and long life expectancy coupled with convenient size.

It is another object of the invention to provide a voltage regulator system employing transistors as control elements which system is stabilized against changes in operating characteristics due to temperature variation.

It is a further object of the invention to provide a voltage regulated power supply which accurately regulates output voltage over a range of load currents.

A feature of the invention is the provision of a forward biased diode as a positive feedback control element across the base-emitter connection of the transistor used to detect variations in output voltages. This element compensates for variations in the reference voltage of the system due to changes in load current.

Another feature is the provision of a voltage divider connected across the aforesaid diode to control positive feedback and reduce the output impedance of the system to any desirably low value.

The single figure of the accompanying drawings is a schematic circuit diagram illustrating a voltage regulator in accordance with one embodiment of the invention.

The invention provides comparison transistor and transistor control means connected thereto which control element may include a plurality of transistors connected in parallel. The base of the comparison transistor is connected with a reverse-biased Zener diode providing a reference voltage so that variations in the output voltage effect a change in base current of the comparison transistor which is amplified and becomes an input signal for the control means. The control means in turn amplifies the input signal again to produce a signal tending to counteract the change in output voltage. A forward biased diode is provided as a positive feedback element in the base-emitter circuit of the comparison transistor and a voltage divider returns a portion of the voltage developed across the diode adding it to the base-emitter voltage which is inversely related to the load current so that a constant output voltage is obtained as the load current is varied. By adjusting the voltage divider, a desirably low effective output impedance can be obtained thus improving the accuracy of control of the system.

The circuit illustrated shows a generator 10 and battery 11 making up a direct current voltage source varying between 10 and 16 volts. The output voltage $E_o$ is supplied across a variable load resistance 13 and is controlled to the desired value. A series control unit made up of PNP transistors 14, 16 and 17 connected in parallel is connected in series between the source and the load. Separate resistors 15 in series with each emitter provide the required current division equalization. A plurality of transistors is provided to reduce the power handled by each but, of course, a single transistor having adequate power handling characteristics may be substituted. The base electrodes of these transistors are connected to the collector electrode 18 of a comparison transistor 19, (also a PNP transistor) which is provided with emitter electrode 21 and base electrode 22. A comparison transistor and the control transistors are connected to a constant current source which supplies base current to control transistors 14, 16 and 17 and collector current to comparison transistor 19. The constant current source is made up of the NPN transistor 23, diode 24 and resistors 26 and 27. A reverse biased Zener diode 28 is connected to the base 22 of comparison transistor 19 and across the load 13 to provide a reference voltage. The temperature-voltage characteristics of the Zener diode 28 are chosen to be complementary to the aggregate temperature coefficient of the forward biased emitter-base junction of comparison transistor 19 and forward biased feedback diode 29, that its voltage changes with temperature are equal in magnitude but opposite in direction. Thus, any changes in junction properties with temperature tend to cancel out one another.

The polarity of the output voltage may be reversed by using NPN units for transistors 14, 16, 17 and 19 and a PNP unit for transistor 23 and reversing the supply voltage.

A positive feedback network is connected between the base 22 and the emitter 21 of the comparison transistor 19. This network includes a forward biased semiconductor diode 29 connected in parallel to a voltage divider made up of resistors 31 and 32. A resistor 33 connected in parallel across the load provides a slight forward bias across the diode 29 to aid in maintaining feedback voltage at low load currents. The current passing through the resistor 27 of the constant current source also aids in this process. A capacitor 34 is also connected across the load 13 to prevent circuit oscillation at high frequencies.

In operation of the circuit illustrated, a decrease in $E_o$ due to a change either in $E_1$ or in the load resistance 13 produces a change in voltage between the base 22 and the emitter 21 of the comparison transistor 19 and produces a change in the base current of that transistor. The Zener diode 28 serves as a reference voltage so that substantially all change in output voltage is reflected as an input signal into the comparison transistor 19. A drop in the base current causes a decrease in the collector current of the transistor 19 designated as $I_{c2}$. Because the constant current source provides a constant current $I_k$, the sum of $I_{c2}$ and the base current into control transistors 14, 16 and 17, $I_{b1}$, is equal to a constant and a decrease in $I_{c2}$ results in a corresponding increase in $I_{b1}$. The increase in the base current of the control transistors results in an increase in their collector currents $I_{c1}$ which results in an increased flow of current through the load resistor 13 tending to restore output voltage $E_o$ to its original value.

Zener diode 28 contains an internal non-linear resistance indicated at 28a. Because of this resistance, there is a slight distortion of the error signal $\Delta E_o$ so that it is not completely reflected across the base-emitter connection of the comparison transistor 19. Changes in load current tend to increase the amount of distortion. Since such distortion causes inaccurate response and faulty regulation, it is desirable to provide a complementary distortion. This is accomplished in accordance with the present invention by providing the positive feedback network including the forward biased diode 29 and the voltage divider made up of resistors 31 and 32. Diode 29 is also a non-linear element and the voltage drop across varies in proportion to the load current. A portion of the voltage thus developed is fed back to the base connection of transistor 19 and compensates for the variation in output voltage caused by the non-linear resistance element of Zener diode 28. The amount of voltage fed back is determined by the relative values of resistors 31 and 32. Adjustment of these values thus permits the effective output impedance of the regulator to be controlled to any desirably low value resulting in effective regulation.

In a particular embodiment of the invention for supplying a constant output voltage $E_o$ of 6.3 volts (within plus or minus 1%) from an unregulated voltage source $E_i$ varying between 10 and 16 volts and with a load current through the resistance 13 of from 0 to 5 amperes, components having the following values were employed.

| | |
|---|---|
| Transistors 14, 16 and 17 | 2N277. |
| Resistor 15 | 0.10 ohms. |
| Transistor 19 | 2N176. |
| Diode 24 | "Transitron" SG-22. |
| Transistor 23 | 2N144. |
| Resistor 26 | 5 ohms. |
| Resistor 27 | 1000 ohms. |
| Zener diode 28 | 6.1 volts breakdown voltage, Texas Instruments type 652C3. |
| Internal resistance 28a | 8-10 ohms. |
| Resistor 31 | 100 ohms. |
| Resistor 32 | 1000 ohms. |
| Diode 29 | General Electric 4JA30B germanium diode. |
| Resistor 33 | 68 ohms. |
| Capacitor 34 | 8 microfarads. |

Thus, in accordance with the present invention, accurate voltage regulation is provided against both changes in input voltage and changes in load. The provision of the positive feedback network in the base-emitter circuit of the comparison transistor gives the circuit the advantage of being stable over a variety of load currents by compensating for variation in the output voltage caused by the non-linear internal resistance of the reference voltage element.

I claim:

1. A voltage regulator power supply including in combination, direct current potential supply means, output terminals for connection of a load, control means including at least one transistor connected between said supply meas and one of said output terminals, a comparison transistor connected to said output terminals, a reference voltage element connected between one output terminal and the base of said comparison transistor, said reference voltage element including a non-linear resistance, said non-linear resistance tending to distort the error signal caused by a change in voltage across said load and apply the distorted signal to said comparison transistor, and positive feedback means including further non-linear resistor means connected to said comparison transistor to compensate for the distortion of said error signal due to said non-linear resistance element, said control means being responsive to an output signal from said comparison transistor and applying current to said output terminals in a sense and direction tending to substantially eliminate changes in voltage across said load.

2. A voltage regulated power supply including in combination, direct current potential supply means, output terminals for connection of a load, a comparison transistor, a control means including at least one transistor with its base connected to the collector of said comparison transistor and connected with its collector and emitter in series between said supply means and one of said output terminals, a Zener diode connected between one output terminal and the base of said comparison transistor, said diode being biased in the reverse direction and including a non-linear resistance, said diode serving as a reference potential so that a change in voltage across said load changes the base current in said comparison transistor to an extent distorted by said non-linear resistance, positive feedback means including further non-linear resistor means in the base-emitter circuit of said comparison transistor adapted to compensate for the aforesaid distortion, the base current of said control transistor means controlling the collector current thereof to substantially eliminate changes in voltage across said load, and a constant source connected to the base of said control transistor means and the collector of said comparison transistor.

3. A power supply according to claim 2 wherein said positive feedback means includes a forward biased semiconductor diode of non-linear resistance.

4. A power supply according to claim 2 wherein said positive feedback means includes a forward biased semiconductor diode of non-linear resistance and a voltage divider connected in parallel with said diode to feed back a selected portion of the voltage drop across said diode to the base-emitter circuit of said comparison transistor.

5. A voltage regulator system having a conducting circuit adapted to be coupled between a source of power to be regulated and a load circuit, including in combination, a comparison transistor, a reference voltage circuit coupled between the conducting circuit and the base of said comparison transistor and including non-linear resistor means tending to distort a reference signal at said comparison transistor which accompanies a voltage change across the load circuit, further non-linear resistance means series coupled with the conducting circuit to be responsive to load current and connected to the base of said comparison transistor to compensate for the distortion of the reference signal, energizing circuit means for the emitter and collector of said comparison transistor, and control circuit means including a transistor adapted to be coupled to the source of power for regulating the output voltage thereof and having an electrode connected to said energizing circuit means for said comparison transistor to be controlled thereby for regulation of the source of power.

6. A voltage regulator system having first and second conductor means adapted to be coupled between a source of power to be regulated and a load circuit, including in combination, a comparison transistor, a reference voltage circuit coupled between the first conductor means and the base of said comparison transistor and including diode means tending to distort a reference signal provided thereby at said comparison transistor, further diode means series coupled with the second conductor means to conduct load current, and means connecting said further diode means to the base of said comparison transistor to compensate for the distortion of the reference signal, energizing circuit means connected to the first and second conductor means for energizing the emitter and collector of said comparison transistor, and control circuit means including a transistor coupled to the conductor means and adapted to be coupled to the source of power for regulating the output voltage of the source and having an electrode connected to said energizing circuit means for said comparison transistor to be controlled thereby for regulation of the source of power.

No referenecs cited.